US012362492B2

(12) United States Patent
Lin et al.

(10) Patent No.: US 12,362,492 B2
(45) Date of Patent: Jul. 15, 2025

(54) MULTI-BAND ANTENNA AND ELECTRONIC DEVICE

(71) Applicant: Wistron NeWeb Corporation, Hsinchu (TW)

(72) Inventors: Hung-Ying Lin, Hsinchu (TW); Wen Tai Tseng, Hsinchu (TW); Kuo Jen Lai, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 146 days.

(21) Appl. No.: 18/500,268

(22) Filed: Nov. 2, 2023

(65) Prior Publication Data

US 2024/0154309 A1 May 9, 2024

(30) Foreign Application Priority Data

Nov. 4, 2022 (TW) ................................ 111142265

(51) Int. Cl.
*H01Q 9/42* (2006.01)
*H01Q 5/378* (2015.01)
*H01Q 1/22* (2006.01)

(52) U.S. Cl.
CPC ............... *H01Q 9/42* (2013.01); *H01Q 5/378* (2015.01); *H01Q 1/2291* (2013.01)

(58) Field of Classification Search
CPC ........ H01Q 1/2291; H01Q 1/243; H01Q 5/30; H01Q 5/378
See application file for complete search history.

(56) References Cited

U.S. PATENT DOCUMENTS

| | | | | |
|---|---|---|---|---|
| 8,779,989 B2 * | 7/2014 | Huang | ..................... | H01Q 9/42 343/848 |
| 2019/0044232 A1 * | 2/2019 | Tseng | ..................... | H01Q 1/245 |

* cited by examiner

*Primary Examiner* — Daniel Munoz
(74) *Attorney, Agent, or Firm* — McClure, Qualey & Rodack, LLP

(57) ABSTRACT

A multi-band antenna includes a substrate with a first surface and a second surface, a first antenna structure with a first antenna coupling segment, a second antenna structure with a second antenna coupling segment, a first grounding section, a coupling section, a via hole, and a second grounding section. Both of the first antenna structure and the second antenna structure are disposed on the first surface. The first grounding section is connected to the first antenna coupling segment. The coupling section is disposed on the second surface and projected onto the first surface to form a coupling region. Both of the first antenna coupling segment and the second antenna coupling segment at least partially overlap the coupling region. The via hole penetrates through the substrate and is connected between the coupling section and the second antenna coupling segment. The second grounding section is connected to the coupling section.

20 Claims, 7 Drawing Sheets

MULTI-BAND ANTENNA AND ELECTRONIC DEVICE

RELATED PATENT APPLICATION

This application claims the benefit of priority to Taiwan Patent Application No. 111142265, filed on Nov. 4, 2022. The entire content of the above identified application is incorporated herein by reference.

BACKGROUND

Technical Field

The present disclosure relates to a multi-band antenna and an electronic device, and more particularly, to a multi-band antenna and an electronic device that operate in WIFI 6E frequency bands.

Description of Related Art

With the rapid development of wireless communication technology, mobile communication devices like notebook computers, tablet computers, and cellular phones all have narrow bezel displays and are trending toward thin-and-light. Under the miniaturization trend, hardware space in the mobile communication device is severely compressed, and so the space allocated for antenna and/or clearance is also relatively limited. Currently, the frequency bands utilized by electronic devices have increased from WIFI (2.4/5) to WIFI 6E, making it more difficult to configure antenna placements to achieve small-size and high gain. At the same time, the number of antennas in one device is also increasing, and the coupling effect between antennas tends to reduce radiation efficiency, especially for antennas that operate in the same frequency band.

From this, an antenna arrangement inside limited space of mobile communication device that maintains high isolation and high radiation efficiency is a goal in the related industry.

SUMMARY

It is an aspect of the present disclosure to provide a multi-band antenna that includes a substrate, a first antenna structure, a second antenna structure, a first grounding section, a coupling section, a via hole, and a second grounding section. The substrate has a first surface and a second surface. The first antenna structure is disposed on the first surface and includes a first antenna coupling segment. The second antenna structure is disposed on the first surface and includes a second antenna coupling segment. The first grounding section is disposed on the first surface and connected to the first antenna coupling segment. The coupling section is disposed on the second surface, and a projection of the coupling section onto the first surface forms a coupling region. The first antenna coupling segment at least partially overlaps the coupling region, and the second antenna coupling segment at least partially overlaps the coupling region. The via hole penetrates through the substrate and is connected between the coupling section and the second antenna coupling segment. The second grounding section is disposed on the second surface and connected to the coupling section.

It is another aspect of the present disclosure to provide an electronic device that includes the aforementioned multi-band antenna.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
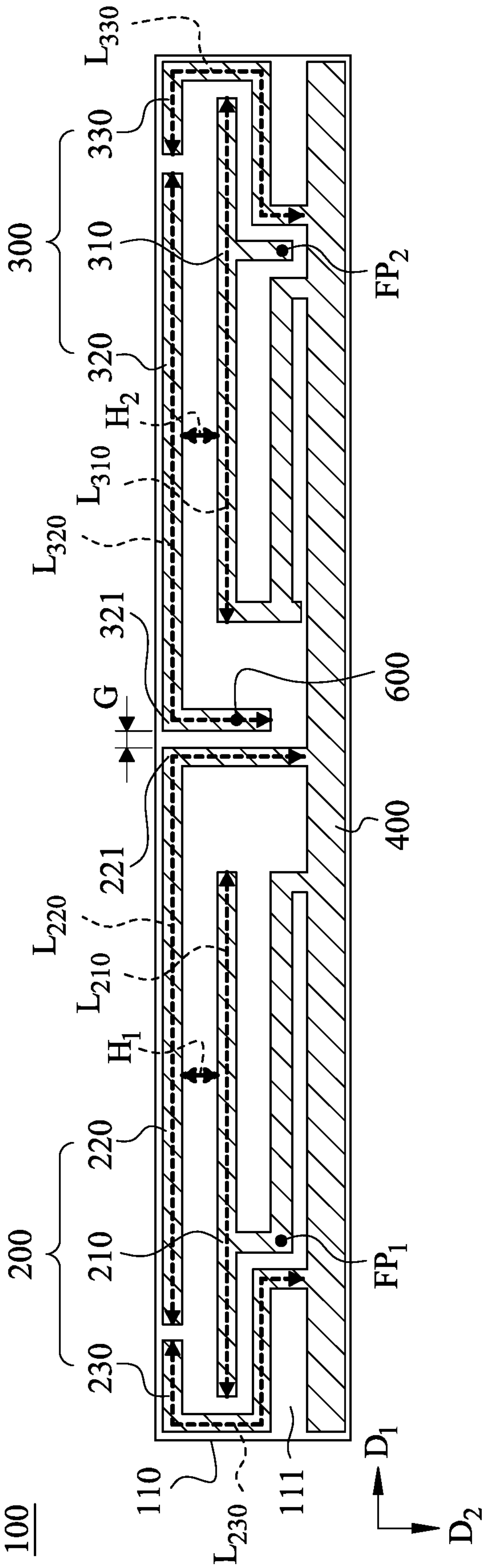
FIG. 1A is a front view of a multi-band antenna according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms, such as "first", "second" or "third" can be used to describe various components, signals or the like, which are for distinguishing one component/signal from another one only, and are not intended to, nor should be construed to impose any substantive limitations on the components, signals or the like.

In the present disclosure, when an element (i.e., a unit or a module) is described to "connect" to another element, it means to that the element is directly connected to the other element, or that certain element is indirectly connected to the other element, which implies that there is another element between the element and the other element. When an element is described to "directly connect" to another element, it means to no other element is between the element and the other element.

Figure 1B:
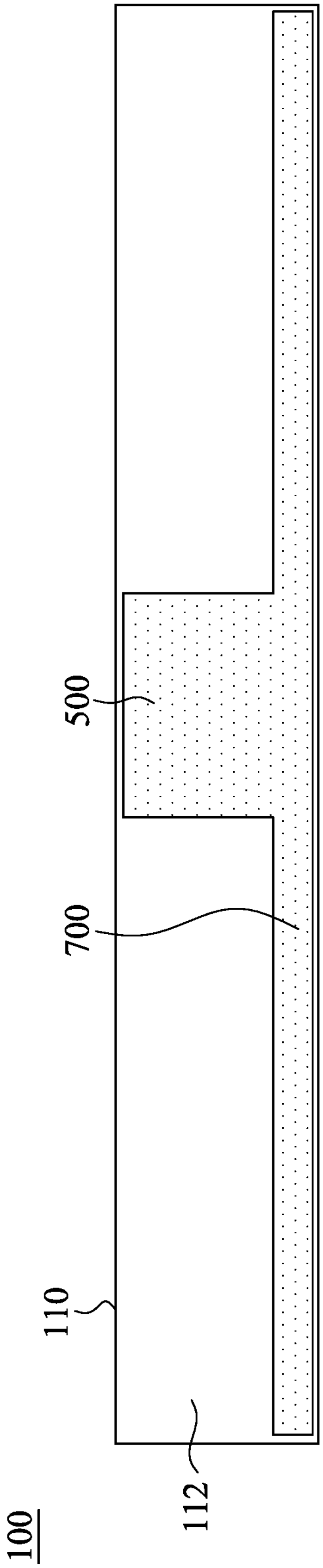
FIG. 1B is a back view of the multi-band antenna according to the first embodiment of the present disclosure.
Figure 2:
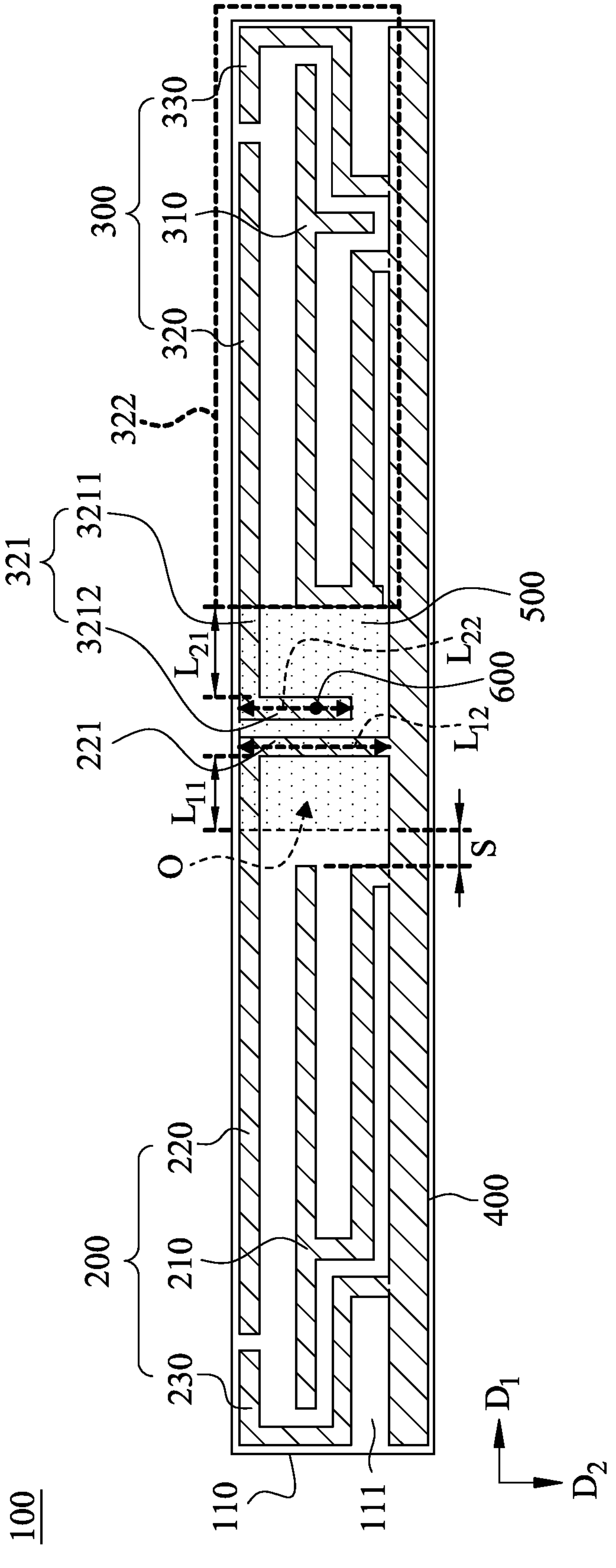
FIG. 2 is a schematic view illustrating a projection of a coupling section of the multi-band antenna shown in FIG. 1B onto a first surface of a substrate.

Referring to FIG. 1A, FIG. 1B and FIG. 2, a multi-band antenna 100 according to a first embodiment of the present disclosure includes a substrate 110, a first antenna structure 200, a second antenna structure 300, a first grounding section 400, a coupling section 500, a via hole 600, and a second grounding section 700.

The substrate 110 can be a planar substrate, such as a system main board, a printed circuit board (PCB), a flame retardant 4 (FR4) substrate, or a flexible printed circuit board (FPCB), of a communication equipment or an electronic device. The substrate 110 has a first surface 111 and a second surface 112, which are respectively the front side and the back side of the substrate 110. The first antenna structure 200, the second antenna structure 300, the first grounding section 400, the coupling section 500, and the second grounding section 700 are made of metal material, such as copper, silver, aluminum, iron, or alloy of the aforementioned metals and can be electroplated and/or 3D printed on the substrate 110.

The first antenna structure 200 is disposed on the first surface 111 and includes a first antenna coupling segment 221. The second antenna structure 300 is disposed on the first surface 111 and includes a second antenna coupling segment 321. The first grounding section 400 is disposed on the first surface 111 and electrically connected to the first antenna coupling segment 221. The coupling section 500 is disposed on the second surface 112 and is projected onto the first surface 111 to form a coupling region O.

Specifically, the first antenna coupling segment 221 completely overlaps the coupling region O, and the second antenna coupling segment 321 completely overlaps the coupling region O. In other words, the first antenna coupling segment 221 and the second antenna coupling segment 321 are located within the coupling region O. The via hole 600 penetrates through the first surface 111 and the second surface 112 of the substrate 110 and is connected between the coupling section 500 and the second antenna coupling segment 321 for electrically connecting the coupling section 500 and the second antenna coupling segment 321. It is to be noted that the number of the via hole 600 is not limited by the present disclosure. The second grounding section 700 is disposed on the second surface 112 and electrically connected to the coupling section 500, and the first grounding section 400 and the second grounding section 700 are coupled to a ground voltage VSS provided by a system ground plane (not shown) of the multi-band antenna 100.

In some embodiments, the area of the substrate 110 is $A_B$, the area of the coupling section 500 is $A_C$, and the relation between the two meets the following: $A_C/A_B \geq 15\%$. The overlapping area of the first antenna coupling segment 221 and the coupling section 500 is $A_{O1}$, the overlapping area of the second antenna coupling segment 321 and the coupling section 500 is $A_{O2}$, the area of the coupling section 500 is $A_C$, and the relation between the three meets the following: $(A_{O1}+A_{O2})/A_C \geq 10\%$. More specifically, the coupling section 500 on the second surface 112 couples with the first antenna coupling segment 221 on the first surface 111 and with the second antenna coupling segment 321 on the first surface 111, respectively, to generate capacitor effect. The capacitor effect is used as an isolation mechanism between the first antenna structure 200 and the second antenna structure 300. Because the capacitance generated by the total coupling area $(A_{O1}+A_{O2})$ can accumulate up to 3 pF to 4 pF, the isolation mechanism as described in the present disclosure can replace physical capacitors, thereby reducing the cost of the antenna system while maintaining good isolation.

In particular, the first antenna structure 200 is an inverted-F antenna (IFA), and the second antenna structure 300 is a loop antenna. In some embodiments, the first antenna structure and the second antenna structure are the same broadband antenna type or different antenna structures.

The first antenna structure 200 further includes a first radiating element 210, a second radiating element 220, and a third radiating element 230. The first radiating element 210 is coupled to a first feeding point $FP_1$ and electrically connected to the first grounding section 400, and the first feeding point $FP_1$ is coupled to a signal source such as a radio frequency (RF) module. The signal source is used to excite the first radiating element 210 to operate in a first frequency band. The second radiating element 220 is spaced apart from the first radiating element 210 and is coupled with the first radiating element 210 to operate in a second frequency band, and the first antenna coupling segment 221 is a portion of the second radiating element 220. The third radiating element 230 is electrically connected to the first grounding section 400 and is spaced apart from the first radiating element 210 and the second radiating element 220, and the third radiating element 230 operates in a third frequency band by coupling with the first radiating element 210. Moreover, there is a coupling gap $H_1$ between the first radiating element 210 and the second radiating element 220, and the coupling gap $H_1$ is greater than or equal to 0.5 mm and less than or equal to 1 mm.

The second antenna structure 300 further includes a first radiating element 310, a second radiating element 320, and a third radiating element 330. The first radiating element 310 is coupled to a second feeding point $FP_2$ and electrically connected to the first grounding section 400, and the second feeding point $FP_2$ is coupled to another signal source to make the first radiating element 310 to operate in the first frequency band. The second radiating element 320 is spaced apart from the first radiating element 310 and couples with the first radiating element 310 to operate in the second frequency band, and the second antenna coupling segment 321 is a portion of the second radiating element 320. The third radiating element 330 is electrically connected to the first grounding section 400 and spaced apart from the first radiating element 310 and the second radiating element 320. The third radiating element 330 couples with the first radiating element 310 to operate in the third frequency band. In addition, a coupling gap $H_2$ between the first radiating element 310 and the second radiating element 320 is greater than or equal to 0.5 mm and less than or equal to 1 mm. By adjusting the lengths of the coupling gaps $H_1$, $H_2$, the impedance matching between the two radiating elements can be optimized. Since the first radiating element 310 couples with the second radiating element 320 and with the third radiating element 330, respectively, the lengths of the second radiating element 320 and the third radiating element 330 can be shortened drastically to meet the goal of antenna size reduction. The radiating elements of the first antenna structure 200 are similar to the radiating elements of the second antenna structure 300 and so will not be described herein. In some embodiments, the third radiating element is coupled to a feeding point and operates in a third frequency band, and so depending on the antenna size and placement requirement, the third radiating element can be set up to couple with the first radiating element (work together) or to connect to other feeding point (work independently), to operate in the third frequency band.

The first frequency band of the first radiating elements 210, 310 is between 5150 MHz and 5850 MHz. The second frequency band of the second radiating elements 220, 320 is between 2400 MHz and 2500 MHz. The third frequency band of the third radiating elements 230, 330 is between 5925 MHz and 7125 MHz. Hence, the multi-band antenna 100 supports the broadband operation defined by WIFI (2.4/5) and WIFI 6E standard. As stated, the multi-band antenna 100 mainly uses two antenna structures, the first antenna structure 200 and the second antenna structure 300; the first antenna structure 200 is used on one side of the first surface 111, and the second antenna structure 300 is used on another side of the first surface 111. Furthermore, the coupling effect created by the coupling section 500 is used to replace physical capacitors, which combines the first antenna structure 200 and the second antenna structure 300 in the limited space of the substrate 110, maintains high isolation, and further makes the overall size of the multi-band antenna 100 more compact.

The second antenna structure 300 shown in FIG. 2 further includes a second antenna main segment 322 composed of the first radiating element 310, the remaining part of the second radiating element 320, and the third radiating element 330, and the second antenna main segment 322 is not located within the coupling region O. The coupling region O is adjacent to the first radiating element 310 of the second antenna structure 300 and a distance S away from the first radiating element 210 of the first antenna structure 200. The second antenna coupling segment 321 includes a first portion 3211 and a second portion 3212. One end of the first portion 3211 is electrically connected to the second antenna main segment 322, and one end of the second portion 3212 is electrically connected to another end of the first portion 3211. The via hole 600 is electrically connected between the coupling section 500 and the second portion 3212.

The first antenna coupling segment 221 and the second antenna coupling segment 321 are spaced apart from each other and both are L-shaped. The coupling section 500 is rectangular-shaped. The first grounding section 400 and the second grounding section 700 are both strip-shaped and are corresponding in position to each other on the first surface 111 and the second surface 112 of the substrate 110, respectively.

Furthermore, there is a gap G between the first antenna coupling segment 221 and the second antenna coupling segment 321 shown in FIG. 1A along a first direction $D_1$, and the gap G is 0.5 mm. A length $L_{11}$ of the first antenna coupling segment 221 along the first direction $D_1$ is less than a length $L_{21}$ of the second antenna coupling segment 321 along the first direction $D_1$, and a length $L_{12}$ of the first antenna coupling segment 221 along a second direction $D_2$ is greater than a length $L_{22}$ of the second antenna coupling segment 321 along the second direction $D_2$. The second direction $D_2$ is perpendicular to the first direction $D_1$.

In particular, in the multi-band antenna 100, the substrate 110 has a length of 38 mm, a width of 5 mm, and a height of 0.4 mm, the coupling section 500 has a length of 6 mm and a width of 4 mm, which equates to the length and width of the coupling region O, and each of the first grounding section 400 and the second grounding section 700 has a length of 38 mm and a width of 1 mm.

For the first antenna structure 200, a resonance length $L_{210}$ of the first radiating element 210 is 17.5 mm and less than one quarter of a wavelength (λ/4) of the first frequency band, and the distance S between the first radiating element 210 and the coupling region O is 1 mm. A resonance length $L_{220}$ of the second radiating element 220 that generates the coupling effect with the first radiating element 210 is one half of a wavelength (λ/2) of the second frequency band. A resonance length $L_{230}$ of the third radiating element 230 is 11 mm.

For the second antenna structure 300, the first radiating element 310 has a resonance length $L_{310}$ of 17 mm and less than one quarter of a wavelength (λ/4) of the first frequency band. The second radiating element 320 has a resonance length $L_{320}$ that is one half of a wavelength (λ/2) of the second frequency band for generating the coupling effect with the first radiating element 310. The third radiating element 330 has a resonance length $L_{330}$ of 11.5 mm. The above size range is derived from extensive experiments and assists in optimizing the operating bandwidth and the impedance matching of the multi-band antenna 100. It is to be noted that the size, shape, frequency of the present disclosure are not limited thereby. The antenna designer can adjust the parameters according to different requirements and the present disclosure is not limited thereto.

Figure 3:
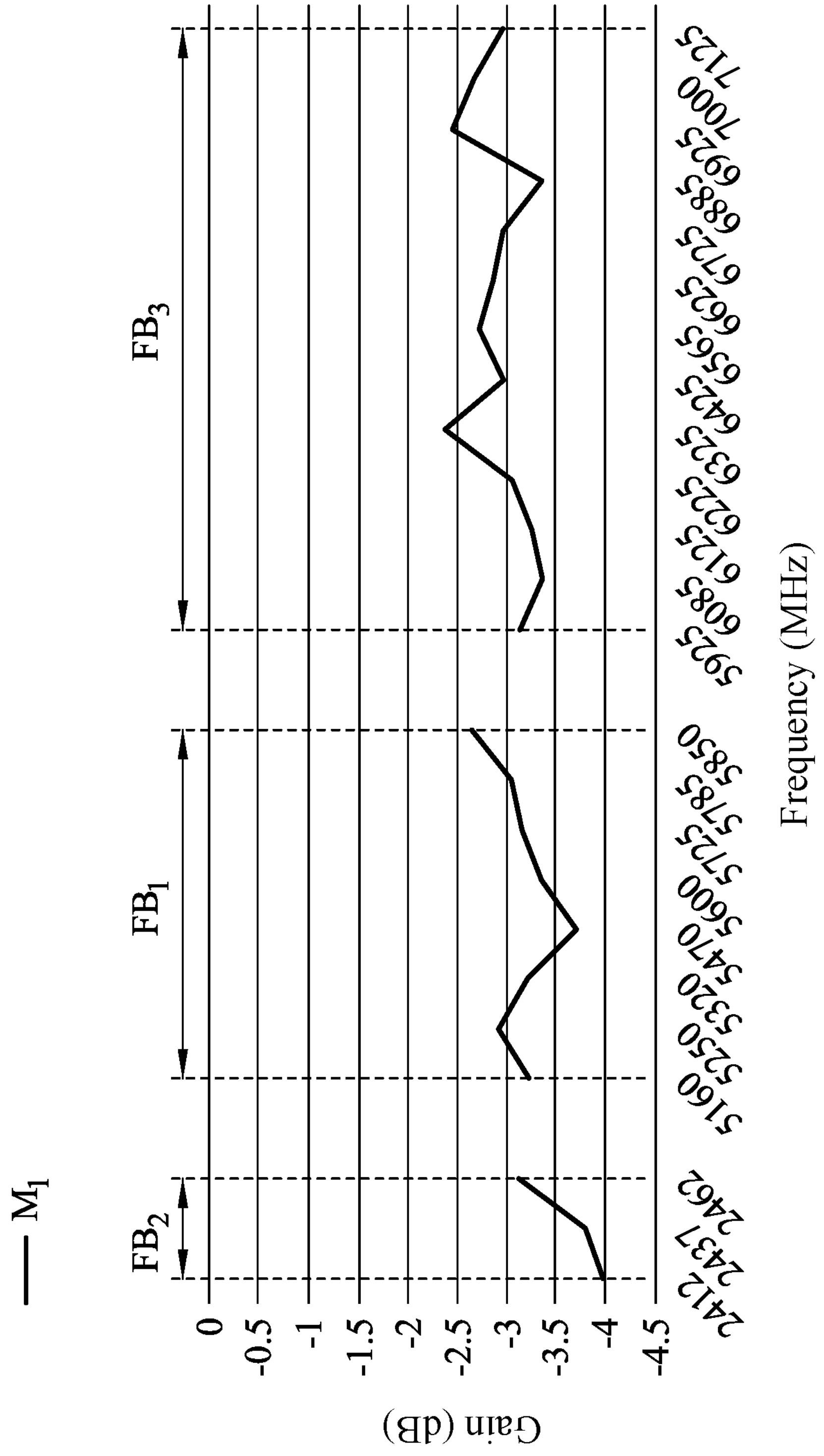
FIG. 3 is a schematic graph illustrating performance of a first antenna structure of the multi-band antenna shown in FIG. 1A.
Figure 4:
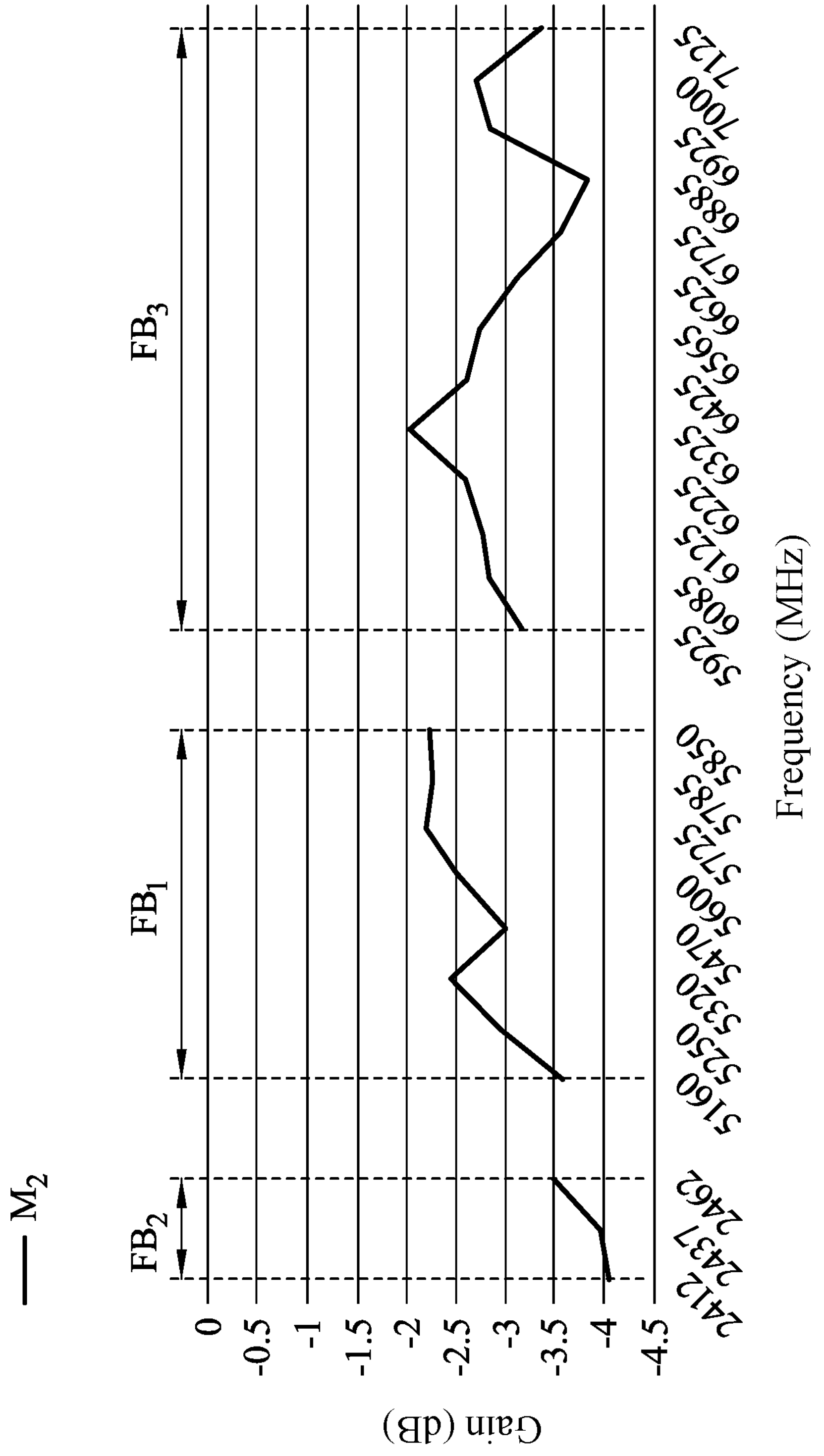
FIG. 4 is a schematic graph illustrating performance of a second antenna structure of the multi-band antenna shown in FIG. 1A.
Figure 5:
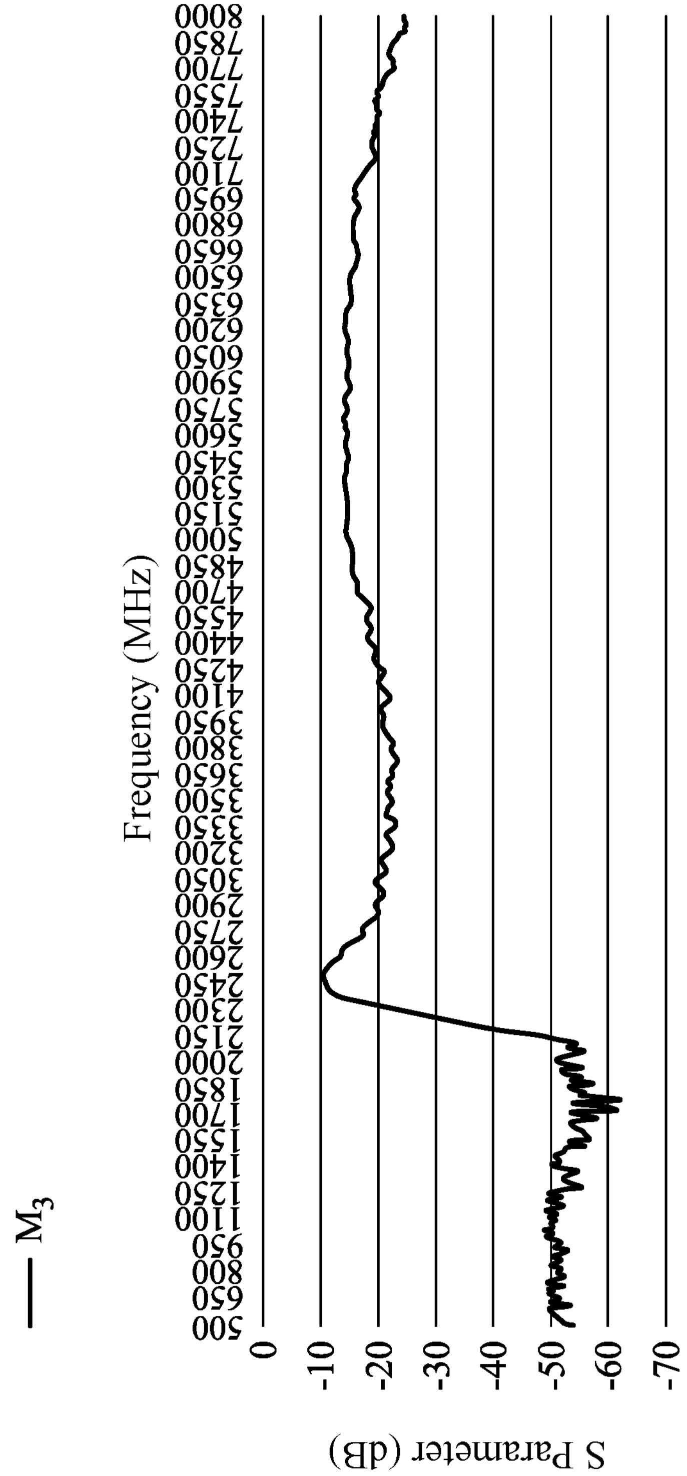
FIG. 5 is a schematic graph illustrating isolation between the first antenna structure and the second antenna structure of the multi-band antenna shown in FIG. 1A.

Referring to FIG. 3, FIG. 4, and FIG. 5, which respectively illustrate the performance of the first antenna structure 200, the performance of the second antenna structure 300, and the isolation between the first antenna structure 200 and the second antenna structure 300, the horizontal axis of FIG. 3 and FIG. 4 represents frequency in MHz, the vertical axis represents gain in dB, the curve $M_1$ is the performance of the first antenna structure 200, and the curve $M_2$ is the performance of the second antenna structure 300. When the first antenna structure 200 is being excited by the signal source, the first radiating element 210 covers the first frequency band $FB_1$, the second radiating element 220 covers the second frequency band $FB_2$, and the third radiating element 230 covers the third frequency band $FB_3$. When the second antenna structure 300 is being excited by another signal source, the first radiating element 310 covers the first frequency band $FB_1$, the second radiating element 320 covers the second frequency band $FB_2$, and the third radiating element 330 covers the third frequency band $FB_3$. The curve $M_3$ in FIG. 5 represents the isolation between the first antenna structure 200 and the second antenna structure 300, where the isolation is an absolute value of S21 parameter. As shown by the curve $M_3$, the isolations at the first frequency band $FB_1$, the second frequency band $FB_2$, and the third frequency band $FB_3$ are between 10 dB and 20 dB, which satisfies the actual application requirement of a multi-input multi-output (MIMO) antenna in general.

Figure 6A:
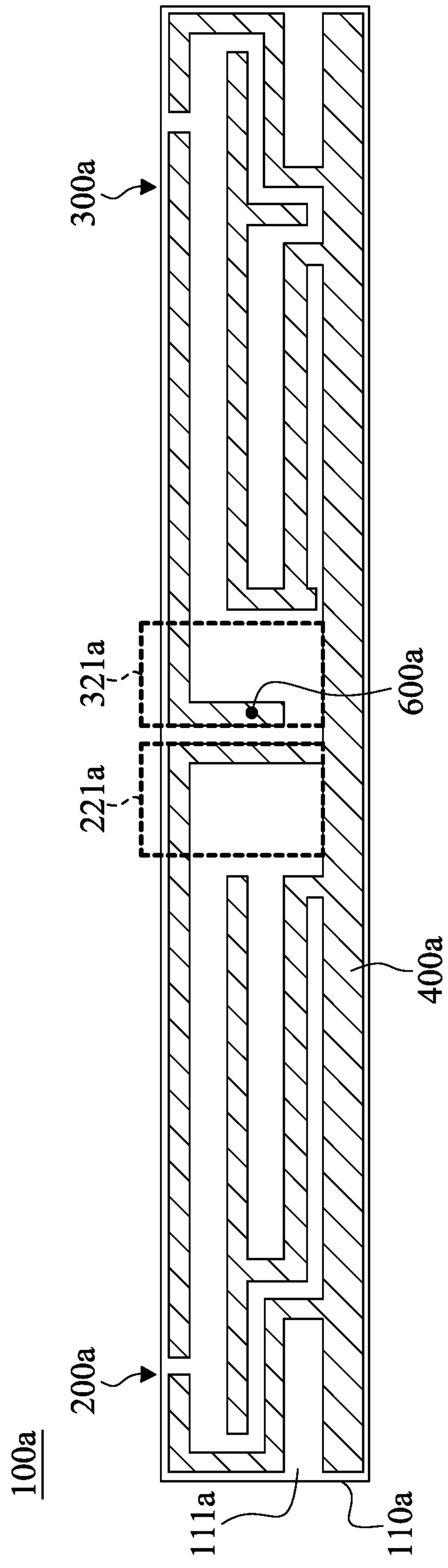
FIG. 6A is a front view of a multi-band antenna according to a second embodiment of the present disclosure.
Figure 6B:
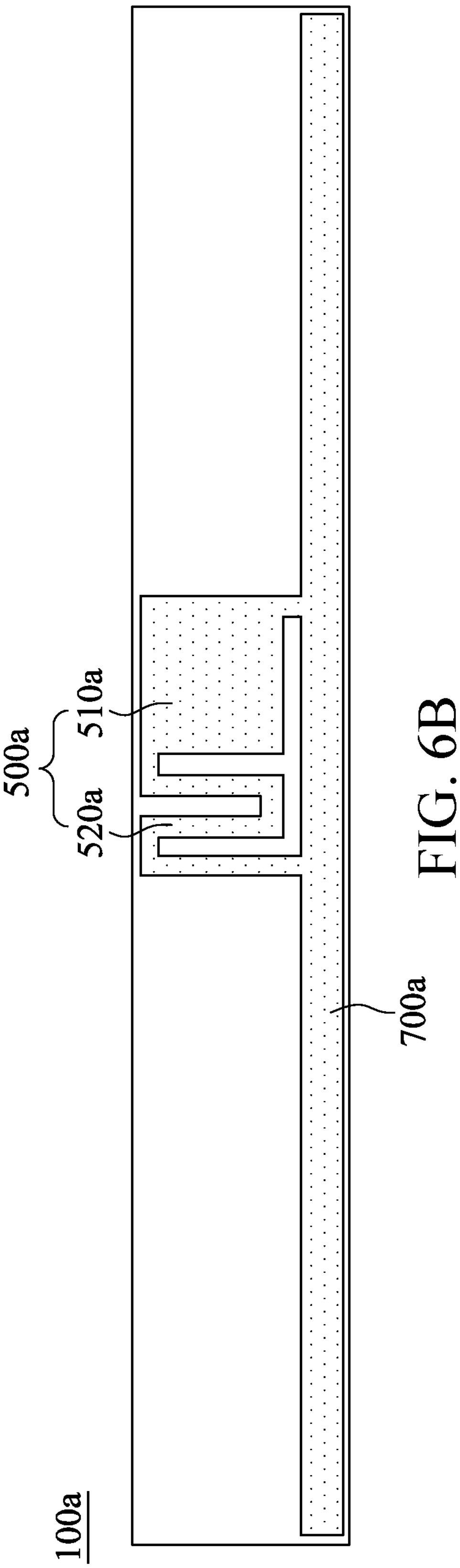
FIG. 6B is a back view of the multi-band antenna according to the second embodiment of the present disclosure.

Referring to FIG. 6A and FIG. 6B, a multi-band antenna **100*a* according to a second embodiment includes a substrate 110*a*, a first antenna structure 200*a*, a second antenna structure 300*a*, a first grounding section 400*a*, a coupling section 500*a*, a via hole 600*a*, and a second grounding section 700*a*. The substrate 110*a*, the first antenna structure 200*a*, the second antenna structure 300*a*, the first grounding section 400*a*, the via hole 600*a*, and the second grounding section 700*a* of the multi-band antenna 100*a* according to the second embodiment are similar to that of the multi-band antenna 100** of the first embodiment, and therefore are not described herein.

The difference between the first embodiment and the second embodiment is that the coupling section **500*a* of the second embodiment includes a first segment 510*a* and a second segment 520*a*. The first segment 510*a* is rectangular-shaped and electrically connected to the second grounding section 700*a*. The second segment 520*a* is a meander structure. One end of the second segment 520*a* is electrically connected to the first segment 510*a*, and the other end of the second segment 520*a* is electrically connected to the second grounding section 700$a$. Similarly, a projection of the coupling section 500$a$ onto the first surface 111$a$ of the substrate 110$a$ forms a coupling region (not shown), and the shape of the coupling region corresponds to the pattern of the first segment 510$a$ and the second segment 520$a$. Moreover, the first antenna coupling segment 221$a$ at least partially overlaps the coupling region, and the second antenna coupling segment 321$a$ at least partially overlaps the coupling region. In other words, a part of the first antenna coupling segment 221$a$ and a part of the second antenna coupling segment 321**$a$ are located in the coupling region.

Similar to the first embodiment, the relation between an overlapping area $A_{O3}$ of the first antenna coupling segment 221$a$ and the coupling section 500$a$, an overlapping area $A_{O4}$ of the second antenna coupling segment 321$a$ and the coupling section 500$a$, and an area $A_B$ of the coupling section 500$a$ meets the following: $(A_{O3}+A_{O4})/A_B \geq 10\%$. Thus, the multi-band antenna 100$a$ utilizes the meander structure in the second segment 520$a$ to increase the current path during coupling and reach specific wavelength so as to improve the isolation between the first antenna structure 200$a$ and the second antenna structure 300$a$.

Figure 7:
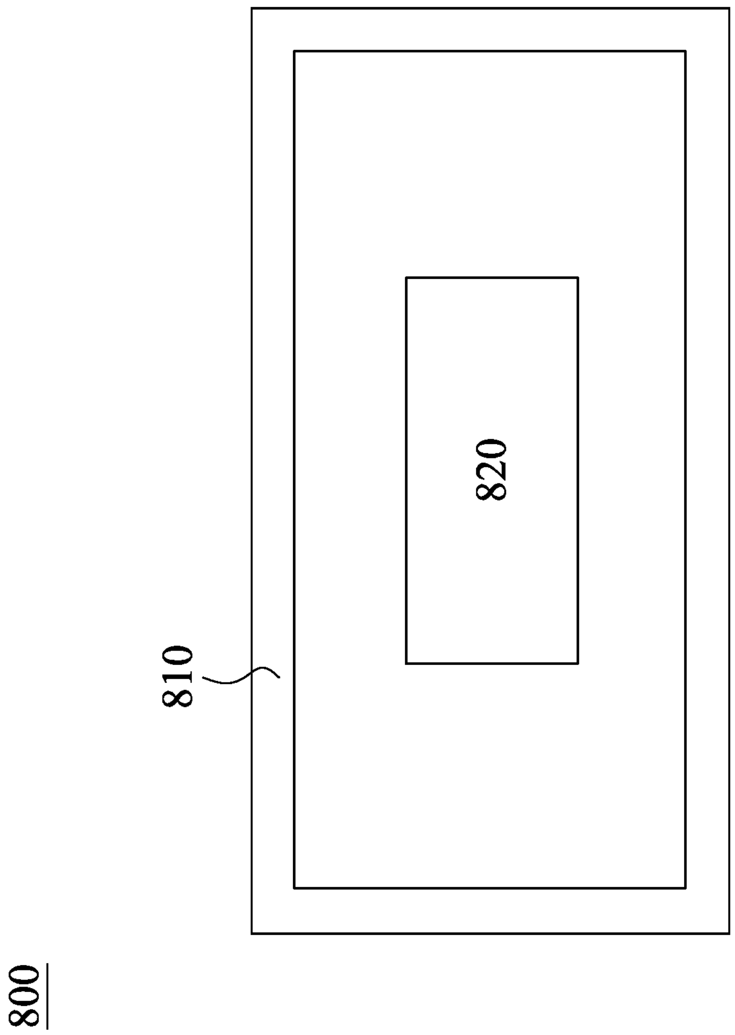
FIG. 7 is a schematic view of an electronic device according to a third embodiment of the present disclosure.

Referring to FIG. 7, according to a third embodiment of the present disclosure, an electronic device 800 includes a housing 810 and a multi-band antenna 820 disposed in the housing 810. The electronic device 800 is a mobile electronic device, such as a smart phone, a tablet computer, or a notebook computer. At least a part of the housing 810 is made of non-electrical-conductive material to transmit electromagnetic wave of the multi-band antenna 820. For example, the multi-band antenna 820 is the multi-band antenna 100 of FIG. 1A, or the multi-band antenna 100$a$ of FIG. 6A, and the structure thereof will not be described herein. It is to be noted that, although not illustrated in FIG. 7, the electronic device 800 further includes other elements like a processor, a storage device, a speaker, a battery module, and/or a touch control panel.

In view of the above, the present disclosure has the following advantages. First, by using the coupling section to couple with the first antenna structure and the second antenna structure, not only is there good isolation between the first antenna structure and the second antenna structure, but also supports the broadband operation in WLAN and WIFI 6E. Second, by replacing physical capacitors with the coupling effect generated by the coupling section, the overall size of the multi-band antenna is reduced. Third, the coupling section can use the meander structure to enhance the isolation.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-band antenna comprising:

a substrate, having a first surface and a second surface;

a first antenna structure, disposed on the first surface and comprising a first antenna coupling segment;

a second antenna structure, disposed on the first surface and comprising a second antenna coupling segment;

a first grounding section, disposed on the first surface and connected to the first antenna coupling segment;

a coupling section, disposed on the second surface, wherein a projection of the coupling section onto the first surface forms a coupling region, the first antenna coupling segment at least partially overlaps the coupling region, and the second antenna coupling segment at least partially overlaps the coupling region;

a via hole, penetrating through the substrate and connected between the coupling section and the second antenna coupling segment; and a second grounding section, disposed on the second surface and connected to the coupling section.

2. The multi-band antenna according to claim 1, wherein the first antenna coupling segment and the second antenna coupling segment are located within the coupling region.

3. The multi-band antenna according to claim 1, wherein an area of the substrate is $A_B$, an area of the coupling section is $A_C$, and $A_C/A_B$ is greater than or equal to 15%.

4. The multi-band antenna according to claim 1, wherein an overlapping area of the first antenna coupling segment and the coupling section is $A_{O1}$, an overlapping area of the second antenna coupling segment and the coupling section is $A_{O2}$, an area of the coupling section is $A_C$, and $(A_{O1}+A_{O2})/A_C$ is greater than or equal to 10%.

5. The multi-band antenna according to claim 1, wherein the first antenna coupling segment and the second antenna coupling segment are spaced apart and L-shaped.

6. The multi-band antenna according to claim 1, wherein a length of the first antenna coupling segment along a first direction is less than a length of the second antenna coupling segment along the first direction.

7. The multi-band antenna according to claim 6, wherein a length of the first antenna coupling segment along a second direction is greater than a length of the second antenna coupling segment along the second direction, and the second direction is perpendicular to the first direction.

8. The multi-band antenna according to claim 1, wherein a gap is formed between the first antenna coupling segment and the second antenna coupling segment.

9. The multi-band antenna according to claim 1, wherein the second antenna structure further comprises a second antenna main segment, and the second antenna coupling segment comprises:

a first portion, connected to the second antenna main segment; and a second portion, connected to the first portion;

wherein the via hole is connected between the coupling section and the second portion.

10. The multi-band antenna according to claim 1, wherein the first antenna structure further comprises:

a first radiating element, coupled to a first feeding point and connected to the first grounding section, wherein the first radiating element operates in a first frequency band;

a second radiating element, spaced apart from the first radiating element and coupling with the first radiating element, wherein the second radiating element operates in a second frequency band, and the first antenna coupling segment is a portion of the second radiating element; and a third radiating element, connected to the first grounding section and spaced apart from the first radiating element, wherein the third radiating element operates in a third frequency band;

wherein a coupling gap is formed between the first radiating element and the second radiating element.

11. The multi-band antenna according to claim 10, wherein the first frequency band is between 5150 MHz and 5850 MHz, the second frequency band is between 2400 MHz and 2500 MHz, and the third frequency band is between 5925 MHz and 7125 MHz.

12. The multi-band antenna according to claim 1, wherein the second antenna structure further comprises:

a first radiating element, coupled to a second feeding point and connected to the first grounding section, wherein the first radiating element operates in a first frequency band;

a second radiating element, spaced apart from the first radiating element and coupling with the first radiating element, wherein the second radiating element operates in a second frequency band, and the second antenna coupling segment is a portion of the second radiating element; and a third radiating element, connected to the first grounding section and spaced apart from the first radiating element, wherein the third radiating element operates in a third frequency band;

wherein a coupling gap is formed between the first radiating element and the second radiating element.

13. The multi-band antenna according to claim 12, wherein the first frequency band is between 5150 MHz and 5850 MHz, the second frequency band is between 2400 MHz and 2500 MHz, and the third frequency band is between 5925 MHz and 7125 MHz.

14. The multi-band antenna according to claim 12, wherein the coupling region is adjacent to the first radiating element of the second antenna structure.

15. The multi-band antenna according to claim 1, wherein the first grounding section and the second grounding section are strip-shaped, and the first grounding section and the second grounding section are disposed respectively on the first surface and the second surface and corresponding in position to each other.

16. The multi-band antenna according to claim 1, wherein the coupling section is rectangular-shaped.

17. The multi-band antenna according to claim 1, wherein the coupling section comprises:

a first segment, connected to the second grounding section and having a rectangular structure; and a second segment, having a meander structure, wherein one end of the second segment is connected to the first segment, and another end of the second segment is connected to the second grounding section.

18. The multi-band antenna according to claim 1, wherein one of the first antenna structure and the second antenna structure is an inverted-F antenna, and another one of the first antenna structure and the second antenna structure is a loop antenna.

19. An electronic device comprising:

a housing; and at least one multi-band antenna, disposed in the housing and comprising:

a substrate, having a first surface and a second surface;

a first antenna structure, disposed on the first surface and comprising a first antenna coupling segment;

a second antenna structure, disposed on the first surface and comprising a second antenna coupling segment;

a first grounding section, disposed on the first surface and connected to the first antenna coupling segment;

a coupling section, disposed on the second surface, wherein a projection of the coupling section onto the first surface forms a coupling region, the first antenna coupling segment at least partially overlaps the coupling region, and the second antenna coupling segment at least partially overlaps the coupling region;

a via hole, penetrating through the substrate and connected between the coupling section and the second antenna coupling segment; and a second grounding section, disposed on the second surface and connected to the coupling section.

20. The electronic device according to claim 19, wherein at least a part of the housing is made of non-electrical-conductive material.

* * * * *